United States Patent [19]
Bitsche et al.

[11] Patent Number: 5,498,216
[45] Date of Patent: Mar. 12, 1996

[54] DRIVE ARRANGEMENT FOR AN ELECTRIC MOTOR VEHICLE AND PROCESS FOR SHIFTING GEARS

[75] Inventors: Otmar Bitsche; Erwin Schneeberfer, both of Graz, Austria

[73] Assignee: Steyr-Daimler-Puch AG, Vienna, Austria

[21] Appl. No.: 197,685

[22] Filed: Feb. 17, 1994

[30] Foreign Application Priority Data

Feb. 18, 1993 [DE] Germany ........................ 43 05 054.9

[51] Int. Cl.⁶ ............................. B60K 41/04; H02P 15/00
[52] U.S. Cl. .......................................... 477/20; 364/424.1
[58] Field of Search .................... 477/20, 7, 15; 364/424.1

[56] References Cited

U.S. PATENT DOCUMENTS

| | | | |
|---|---|---|---|
| 1,527,247 | 2/1925 | Bouillon ................................ | 477/15 |
| 4,493,228 | 1/1985 | Vukovich et al. ............... | 364/424.1 X |
| 5,136,897 | 8/1992 | Boardman ...................... | 364/424.1 X |
| 5,239,894 | 8/1993 | Oikawa et al. .................. | 364/424.1 X |
| 5,395,293 | 3/1995 | Matsuura et al. ......................... | 477/20 |

FOREIGN PATENT DOCUMENTS

| | | | |
|---|---|---|---|
| 0021877 | 9/1982 | European Pat. Off. . | |
| 2927793 | 1/1981 | Germany .............................. | 477/15 |
| 3605377 | 8/1987 | Germany . | |
| 4212324 | 8/1992 | Germany . | |

*Primary Examiner*—Charles A. Marmor
*Assistant Examiner*—Nathan O. Jensen
*Attorney, Agent, or Firm*—Meltzer, Lippe, Goldstein, et al.

[57] ABSTRACT

A drive arrangement for an electric motor vehicle comprises an electric motor, a control rectifier which is connected to and controls the output of the electric motor, a gear box having at least first and second gears, and first and second positively engaging clutches, such as dog clutches, which are associated with the first and second gears. A movable actuator is also provided which causes the first and second positively engaging clutches to engage the first and second gears. A control unit is connected to the actuator and the control rectifier. The control unit receives signals indicative of the rotational speeds at the input and output sides of the gear box, and of the position of the actuator. Based on these signals, and optionally other signals as well, the control unit issues command signals to control the position of the actuator and the output of the electric motor, via the control rectifier, to synchronize engagement of the first and second gears by the positively engaging clutches, thereby avoiding the need for mechanical synchronization. A process for controlling synchronous engagement of the gears is also disclosed.

12 Claims, 9 Drawing Sheets

DRIVE ARRANGEMENT FOR AN ELECTRIC MOTOR VEHICLE AND PROCESS FOR SHIFTING GEARS

BACKGROUND OF THE INVENTION

The invention relates to a drive arrangement for an electric motor vehicle comprising an electric motor the output of which is controlled by means of a control rectifier, a transmission having at least two gears, a coupling associated with each of the gears in the transmission, an actuator which engages the couplings, and a control system which synchronizes the engagement of the coupling halves.

Generally, electric motor vehicles are equipped either with hand-operated multistage transmissions or with single-stage fixed transmissions. The latter have the disadvantage that a very large engine with correspondingly powerful components is required to achieve satisfactory road performance. Naturally, this affects weight and cost of the electric motor vehicle.

Multistage transmissions are generally larger and heavier than necessary (especially if they are adapted from the transmission of mass-produced combustion engine vehicles) because a transmission with only one or two forward gears is sufficient for an electric motor vehicle. Since the output of modern electric motors (magnitude and direction of rotation) can be controlled as desired by means of control rectifiers, a dedicated reverse gear is not needed.

In electric motor vehicles, it is desirable to have the lowest possible vehicle weight and the highest recovery of energy during braking because of the limited capacity of known storage batteries. Drive aggregates should therefore be as light as possible and take up as little space as possible since a vehicle will become heavier through increases in size alone. Furthermore, automatic transmissions are desirable since electric motor vehicles are mainly meant for city traffic. However, automatic transmissions have not been used heretofore in electric motor vehicles because of their high cost and low efficiency.

A two-gear transmission for electric motor vehicles where one or two free gears can be engaged via a multiple-disk clutch to the drive shaft is known from DE-A 42 12 324. Neither a dedicated reverse gear nor a separation coupling is provided in this transmission. The device which actuates the multiple-disk clutch does not have a neutral position. In a first step during the shifting process, a free wheel device is provided, not only to improve gear-shifting comfort, but mainly because otherwise the rapidly running electric engine together with its transmission would have to be accelerated to high velocity when shifting down into first gear.

This known transmission has, however, several disadvantages: Due to the utilization of friction clutch plates, the shifting process is relatively slow and fraught with considerable losses in energy—in the friction clutch itself and also because no recovery of energy during braking is possible because of the free wheel device, precisely when shifting down. Furthermore, the space requirement for the two multiple-disk clutches and therefore for the entire transmission is considerable.

A drive arrangement for an electric motor vehicle in which a separation coupling is automatically opened at the beginning of the shifting process and in which a computer receives signals indicative of engine RPM's and the gear which is engaged to produce an actuating signal is known from EP-B 21 877. The actuating signal produces a corresponding change in the engine RPM's as soon as the gear shift lever is in the new shifting position. Because of the direct manual gear shifting and the separation coupling, and in spite of the computer, the attainment of synchronization in the transmission itself is not ensured and mechanical synchronization with all its disadvantages must still be provided in this known transmission.

Finally, DE-A 36 05 377 discloses a drive arrangement suitable for any type of vehicle engine, having a multi-step reduction gear and a separation coupling, wherein the rotational speeds of the gears are synchronized with the driving engine by accelerating or decelerating the engine. This is done, however, with a disengaged separation coupling so that the part of the separation coupling on the transmission side and the part of the transmission on the input side must again be decelerated or accelerated by mechanical synchronization. In this drive, the special characteristics of an electric drive are not taken into consideration and the advantage to the driver is only minor.

It is therefore the object of the instant invention to provide a drive mechanism for an electric motor vehicle, and a method for shifting the gears of same which achieve the driving comfort of an automatic transmission with minimum constructive outlay and greatest economy.

SUMMARY OF THE INVENTION

In accordance with the present invention, a drive arrangement for an electric motor vehicle comprises an electric motor, a control rectifier which is connected to and controls the output of the electric motor, a gear box having at least first and second gears, and first and second positively engaging clutches, such as dog clutches, which are associated with the first and second gears. A movable actuator is also provided which causes the first and second positively engaging clutches to engage the first and second gears. A control unit is connected to the actuator and the control rectifier. The control unit receives signals indicative of the rotational speeds at the input and output sides of the gear box, and of the position of the actuator. Based on these signals, and optionally other signals as well, the control unit issues command signals to control the position of the actuator and the output of the electric motor, via the control rectifier, to synchronize engagement of the first and second gears by the positively engaging clutches, thereby avoiding the need for mechanical synchronization.

According to the invention, the couplings of the gear box are positively engaging clutches, such as dog clutches, which are not mechanically synchronized. Rather, the control system acts on the one hand upon the actuator and on the other hand upon the control rectifier so that synchronization of the respective coupling halves is achieved before they are engaged.

The positively engaging dog clutches, because they are frictionless, function without any energy loss, take up very little space, and need only minimal shifting forces. The control system which acts upon the actuator as well as upon the motor controls the entire shifting process. It makes full use of the flexibility and speed of control rectifier technology so that the great disadvantage of a dog clutch, namely, shiftability only with synchronization, is overcome. At the same time, the invention makes full use of the advantages of the dog clutch. This makes it possible to establish synchronization rapidly and precisely even without the use of a separation coupling. It also makes it possible to engage the clutch at precisely the right moment. The operating and driving comfort of an automatic transmission is thus attained while saving energy and with a minimum of installation space.

Based on known automatic transmissions in vehicles with a combustion engine, further developments of the invention can also provide for a manual gear selection lever in order to select a desired gear. A signal indicative of the manually selected gear is conveyed to the control system. For this, an input to the control system is all that is necessary, and no other intervention is required. Synchronization of the coupling halves for the preselected gear will then be established with the same precision as in the case of an automatically selected gear.

A simplification is possible if signals indicative of the RPM's and/or the torque produced by the motor are provided to the control unit by the control rectifier. The control system itself may be made in a variety of forms. It is however especially advantageous to use a microprocessor in the control system. With a microprocessor, the motor can be actuated via the control rectifier in such manner that the synchronous rotational speeds required for the shifting process can be reached very rapidly and precisely.

An inventive process for synchronizing shifting of the gears in the above-described electric motor vehicle comprises:

(a) verifying whether the actually engaged gear is the desired gear, (b) if not, issuing a shift command signal which lowers the torque being produced by the electric motor to zero along a defined lowering torque path, (c) bringing the actuator into a neutral position, (d) by means of the control rectifier, changing the output of the electric motor until it is rotating at a target rotational speed, (e) by means of the actuator and the couplings, causing the desired gear to become engaged once the electric motor reaches the target rotational speed, and (f) increasing the torque produced by the electric motor to a desired torque along a defined increasing torque path.

The continuous verification step which checks whether the correct gear has been engaged and whether the gear has been engaged correctly prevents erroneous gear shifting which is otherwise possible with a dog clutch. By lowering the torque the respective dog clutch can be disengaged or engaged very rapidly and with little shifting force. Nevertheless, no perceptible jolt occurs because changes in torque evolve in a defined manner. This also applies to increases in torque to the prior value at the end of the shifting process.

While the actuator is held in neutral position, synchronization can be established without having to fear untimely shifting into gear. The establishment of synchronization is especially economical and rapid because only the rotational speed of the motor while it is at no-load needs to be changed via the control rectifier.

According to another characteristic of the inventive process, the desired gear is automatically and repeatedly determined from the current driving data: input transmission RPM's, output transmission RPM's and input transmission torque or engine torque. Thus an updated value is always available and the control system reacts promptly to a change in driving conditions. If a desired gear is pre-selected with a selector lever, the control system reacts promptly thereto. The position of the selection lever can be ascertained and incorporated in the process in only a single computer step.

In an advantageous embodiment of the process, the actual speed at the input side of the transmission is first polled, and then a limit rotational speed is calculated for same depending on the actual value. From this limit value, a desired rotational speed is then calculated by comparison with the actual rotational-speed at the input side. By calculating the limit rotational speed in the current gear as an intermediate magnitude, the shifting threshold is also defined, and thus not only shifting into the correct gear but also shifting at the then-correct rotational speed is ensured. The limit rotational speed and thereby the shifting threshold is correct because it is calculated from a gear-dependent constant value, a torque-dependent variable value and a hysteresis factor. This also ensures that the transmission will not be hunting between two gears.

According to another characteristic of the process, the desired gear is compared with the actual gear, and, in case of inequality, with the brake not being actuated, a shifting command is given. Due to the fact that the comparison is not made between travel state magnitudes but only between actual and target gear, the decision can easily be tied logically to safety conditions.

In a further development of the process, the torque of the electric motor is lowered to zero following an evolution as a function of the gas pedal position and a decision is made on the basis of the actual gear and the target gear whether or not the neutral position is to be adopted next. Thanks to this step which may at first glance appear to be trivial, the shifting process can be carried out recursively with one single additional polling and it is possible to shift into a gear also from the neutral position during travel.

If the mean rate of increase of the rotational speed at the transmission output is also taken into account when ascertaining the target rotational speed of the electric motor, it is possible to shift back into gear especially softly. If the engine speed is then also increased to the value indicated by the current position of the gas pedal, the torque attains the value indicated by the gas pedal entirely without any jolt.

The reliability of the process can be further increased in that the current gear is not simply ascertained by the gear sensor but is calculated from the ratio between speed at the input side and the output side of the transmission and is compared with the signal provided by the position sensor before comparing the current gear with the desired gear. The actuator is actuated in case of inequality of results only when the engine and the vehicle are stopped.

Safety measures can easily be implemented at many stages with the logical structure of the process according to the invention. Their significance is easily underestimated in the development stage. They are, however, essential in vehicle operation under the conditions of daily driving and mechanical wear.

BRIEF DESCRIPTION OF THE DRAWINGS

The invention is explained below through the drawings, wherein.

DETAILED DESCRIPTION OF A PREFERRED EMBODIMENT

Figure 1:
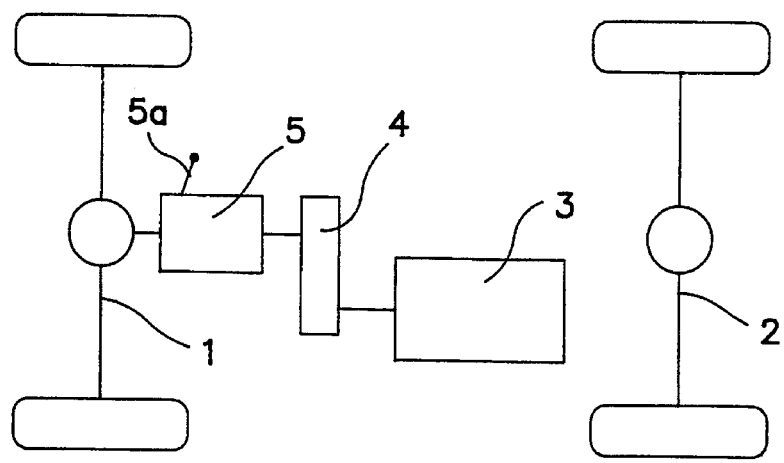
FIG. 1 shows a schematic representation of an electric motor vehicle having a drive arrangement according to the invention.

In FIG. 1, an electric motor vehicle is illustrated schematically by a front axle 1 and a rear axle 2. A controllable electric motor 3 drives gear box 5 directly, without a separation coupling, via a step-down gear 4 which can also be dispensed with if the nominal engine speed is sufficiently low or the final drive reduction is sufficiently great. A manual gear selection lever, schematically shown as 5a, may optionally be used for gear selection.

Figure 2:
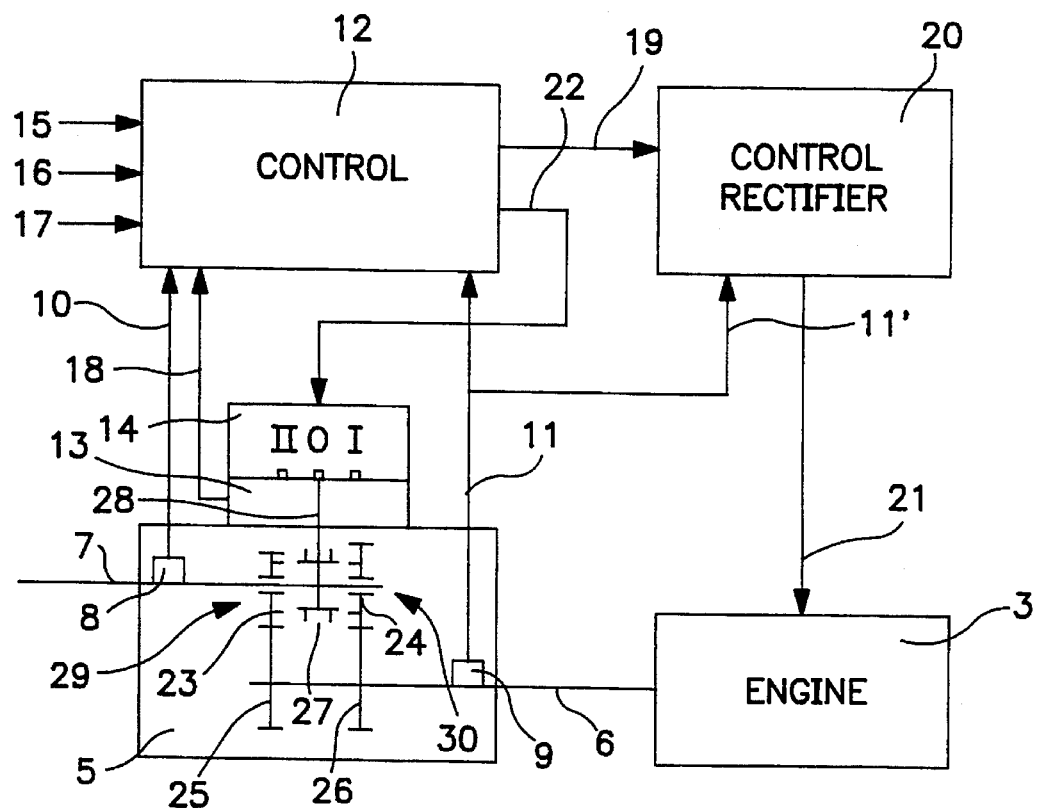
FIG. 2 shows a schematic diagram of the inventive drive arrangement.

Of the entire drive unit shown in FIG. 1, FIG. 2 only shows the electric motor 3 and gear box 5. The gear box 5 is a transmission with two or possibly three forward gears and no reverse gear. A first shaft 6 on the input side of the gear box 5 establishes the connection to the electric motor, while a second shaft 7 on the output side leads to the axle 1 (FIG. 1). RPM sensors 8,9 provide signals indicating the RPM's at the input and at the output sides over lines 10, 11 to a control unit 12. The signal giving the RPM's of the first shaft 6 optionally can also be delivered directly to control rectifier 20 over line 11' as shown. The gear box 5 is furthermore equipped with an actuator 14 which produces the necessary shifting movements to change gears in gear box 5. A position sensor 13 produces a position signal 18 whereby the control system 12 is informed of the current position of the actuator 14.

This embodiment of the gear box 5 is a two-gear transmission. In a different embodiment, it could also have three gears. The first shaft 6 is provided with two fixed gears 25, 26 which mesh with two free gears 23, 24 on the second shaft 7. A coupling sleeve 27 or a coupling element (depending on the type of coupling) is non-rotatably connected to the second shaft 7 and can be coupled from a neutral position "0" selectively to one of the free gears 23, 24, depending on which of the two gear positions "I" or "II" is to be selected. A first coupling 29 comprises the coupling sleeve 27 and the corresponding teeth or dogs of the free gear 23, and a second coupling 30 comprises the coupling sleeve 27 and the teeth or dogs of the free gear 24. The shifting movement is carried out via a fork 28 which extends from the actuator 14 into the interior of gear box 5. It is an essential feature of the invention that the gear box 5 is not mechanically synchronized, and for this reason simple dog or tooth clutches 29,30 suffice. The synchronization is ensured by the control system 12. The control system 12 receives a gas pedal position signal 15, a braking signal 16, and a gear selection signal 17. To accommodate drivers used to combustion engines, the brake pedal is designed so that the braking signal 16 first causes a braking of the motor and acts in addition on the wheel brakes only if the applied pedal force exceeds a predetermined value. The control unit 12 comprises a microprocessor which is loaded with a program consisting of a routine and subroutines to generate output signals 19 and 22 on the basis of the input signals 10,11,15,16,17 and 18. The output signal 19 acts upon the control rectifier 20 to control the output of the electric motor 3, while the output signal 22 acts upon the actuator 14 of the gear box 5.

Figure 3:
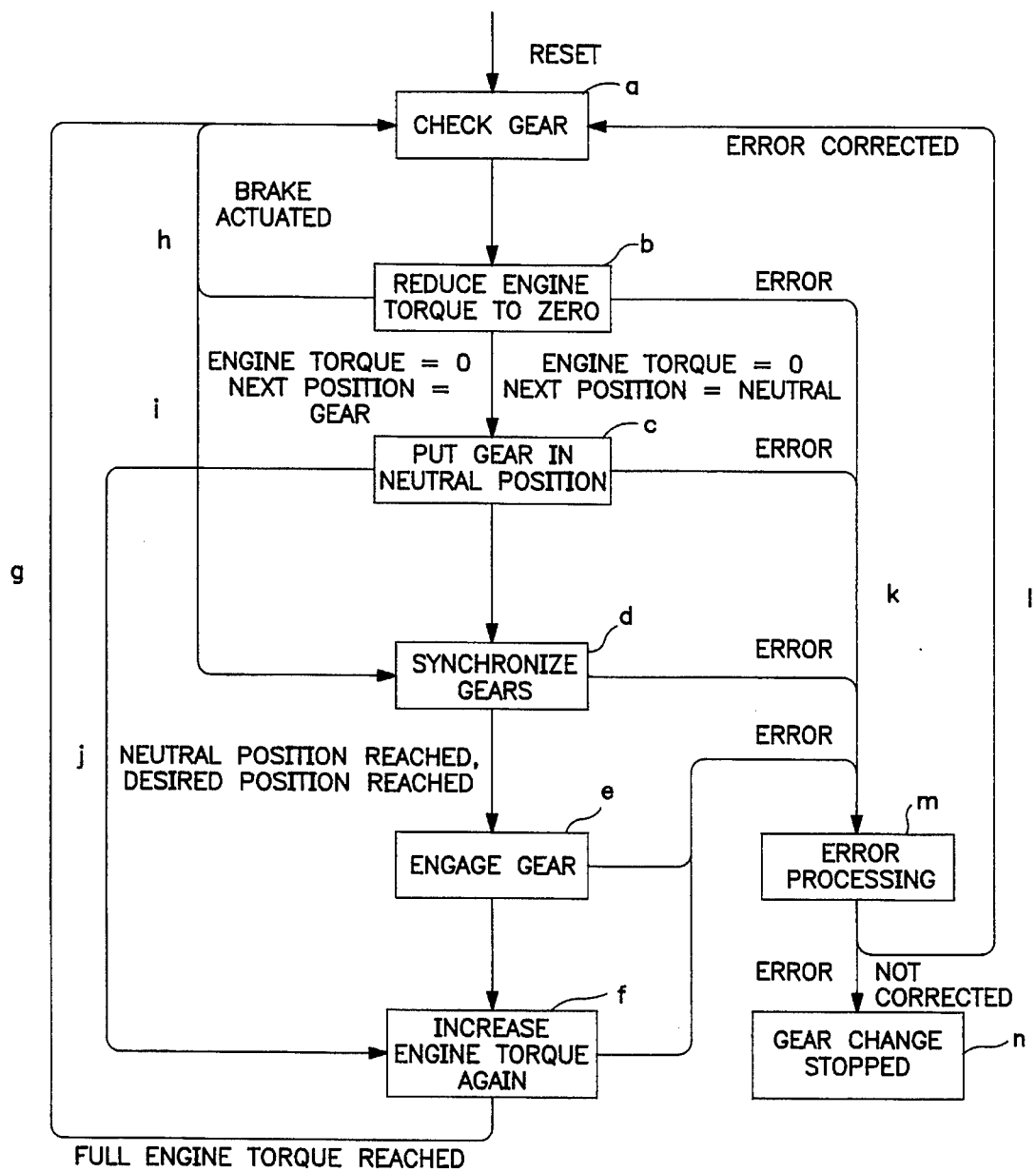
FIG. 3 shows a status diagram which summarily shows the steps of the process according to the invention by means of status fields.
Figure 4:
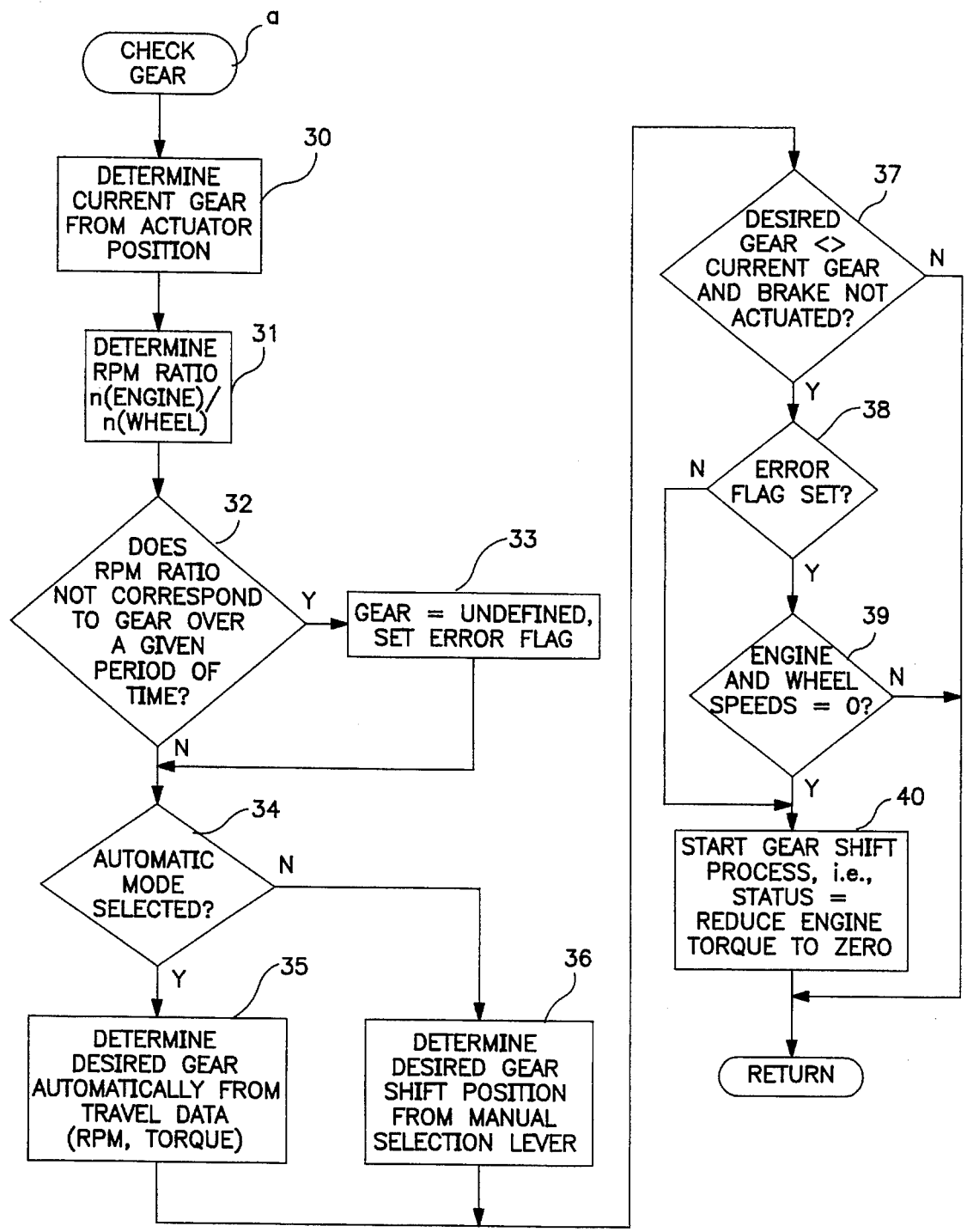
FIGS. 4 to 10 show flow charts pertaining to the individual fields of the diagram of FIG. 3.

FIG. 3 shows the sequence of the process steps of gear shifting, called routines hereinafter, in a status diagram. The process step "check gear", field a of FIG. 3 and shown in detail in FIG. 4, consists of a continuously running routine. A sub-routine of the routine shown in FIG. 4 is shown in greater detail in FIG. 5. If the necessity of gear shifting is ascertained, the system goes to the next process step "reduce engine torque to zero", field b of FIG. 3, shown in detail in FIG. 6. When the reduction in torque has been effected, the next process step, "put gear into neutral position", field c in FIG. 3, shown in detail in FIG. 7, follows. When the transmission is in neutral position, the actual synchronization is carried out. This step is denoted as "synchronize gears", field d in FIG. 3, and is shown in detail in FIG. 8. This is followed by the next routine, "engage gear", field e in FIG. 3, shown in detail in FIG. 9. When the gear has been engaged and the desired position of the actuator has been reached, the routine "increase engine torque again", field f in FIG. 3, shown in detail in FIG. 10 follows.

Already in the status diagram, it can be seen that a complete safety concept has been realized, taking all eventualities into account. When it is found in the routine "reduce engine torque to zero", field b, that the wheel brake has been actuated, the transmission is not brought into neutral position, but the system goes via loop h back to field a. This prevents the braking effect of the engine from being subtracted when braking by means of the wheel brake takes place. If it is found in field b that the transmission is already in neutral, field c is skipped via the loop i and the system continues to field d. If it is found in field c that the neutral position is also the desired position, the system jumps ahead via loop j to field f. When the routine "increase engine torque again", field f, has been completed, the system starts again from the beginning in field a after going through loop g. Control steps are also provided in the routines b,c,d and f themselves. If these lead to an error message, the latter goes along loop k to field m. There an attempt is made to correct the error and in case of success, the system returns via loop 1 to the field a. Otherwise, the changing of gears is aborted as shown in field n.

FIG. 4 shows the routine "check gear". To determine the current gear (field 30) the sensor 13 (FIG. 2) is polled on the position of the actuator 14 (FIG. 2). The RPM ratio is then derived from the signals of the RPM sensors 8,9 (field 31) and is compared over a certain period of time with the position of the actuator as per field 32. If the two do not match, an error flag is set (field 33). If they do match, the system asks in field 34 whether the automatic mode has been selected. If it was selected, the desired gear is determined in field 35 automatically on the basis of the current travel data: transmission input RPM, transmission output RPM and input torque. The transmission input and output RPM's are obtained first from the signals of the RPM sensors 8,9, and the signal for input torque is taken from the control rectifier 20. If the automatic mode is not selected, signal 17 from the manual selection lever (not shown) is read into field 36. If no manual selection lever is provided the fields 34 and 36 can be omitted.

Figure 5:
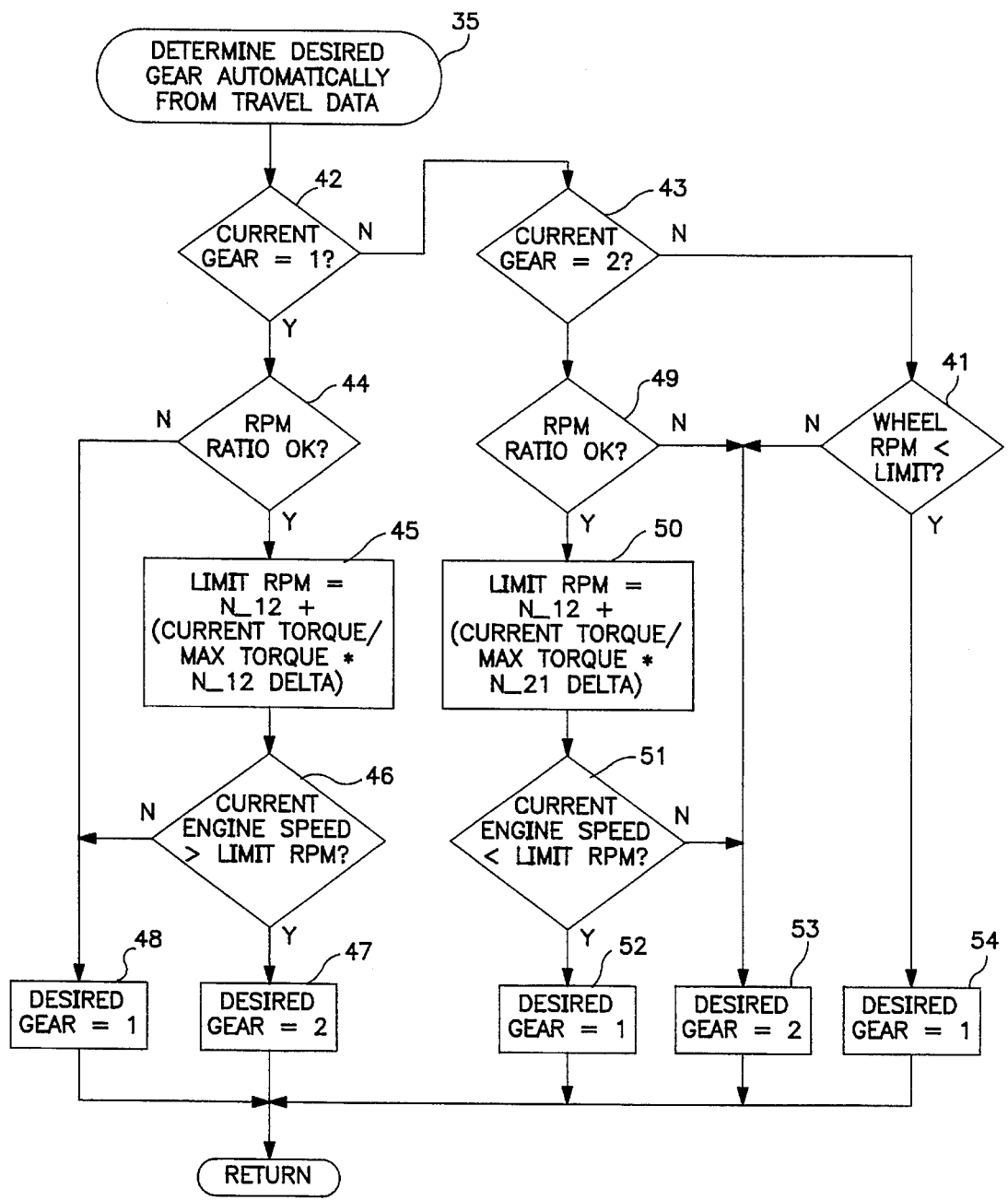

Field 35 represents a sub-routine which is carried out in FIG. 5. In FIG. 4, the next step consists in comparing the desired gear determined in field 35 or 36 with the current gear, and determining whether the brake is actuated. If the desired gear and the current gear are different, and the brake is not being applied, the system asks in field 38 whether an error flag has already been set. If the answer is in the affirmative, and if the vehicle is not standing still (field 39), the change of gears is not started and the system returns via "return" to routine a in FIG. 3. If no error flag is set, the system continues from field 38 through field 40 into field b of FIG. 3.

The sub-routine "determine desired gear automatically from travel data" in FIG. 5 is started from field 35 in FIG. 4. The current gear is ascertained in fields 42 and 43. If it is the 1st gear (field 42) or the 2nd gear (field 43), the RPM ratio is first checked in the field 44 or 49, and the limit speed for the current gear is then determined in the fields 45 or 50. The limit speed in 1st gear is a given constant N_12 (in the second gear it is N_21), plus the ratio between the current torque to maximum torque, multiplied by a hysteresis factor N_12delta (N_21delta in the 2nd gear). If the current speed is higher in 1st gear, or lower in 2nd gear than the limit speed (field 46 or 51), the other gear is declared to be the desired gear in the field 47 or 52. In case of a three-gear transmission, two limit speeds must be provided for the middle gear. If an error is found in the field 44 or 49 during the verification of the rotational speed ratio, the current gear is defined as the desired gear in the field 48 or 53. If it is found in the field 42 or 43 that neither of the two gears is selected, that is to say that the actuator is in neutral position, either the 1st gear (field 54) or the 2nd gear (field 53) becomes the desired gear upon comparison between the transmission output speed (or the wheel speed) and a limit value in field 41. Upon completion of this sub-routine the system returns via "return" into field 35 of FIG. 4.

Figure 6:
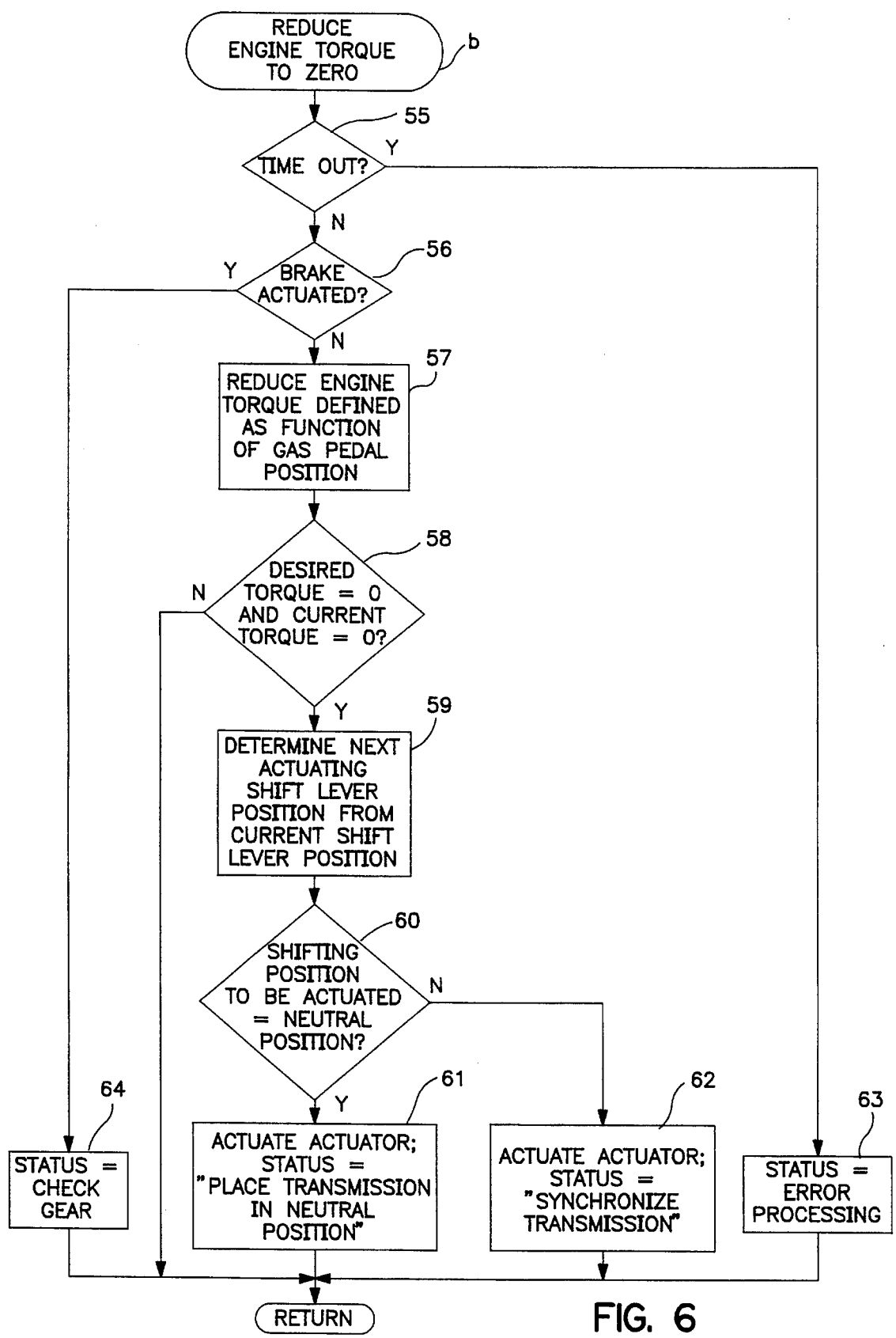

FIG. 6 represents the routine b (FIG. 3) "reduce engine torque to zero". A time limit is predetermined through field 55, and when it is exceeded, an error message is produced via field 63 and "error processing" is continued in field m in FIG. 3. If the brake is actuated (field 56) the system goes via status message "check gear" (field 64) to field a, in FIG. 3. If not, and via the sub-routine "reduce desired engine torque while taking into account the gas pedal position" (field 57) which is not shown in detail, desired torque calculated on the basis of this sub-routine is prescribed to the control rectifier until the desired torque is equal to zero (field 58). After going through the sub-routine "determine next actuating shift lever position on the basis of the current actuating shift lever position" (field 59), it is decided in field 60 whether the "shifting position to be actuated is the neutral position". If yes, the status field c (FIG. 3) "place transmission in neutral position" is triggered in field 61. If not, the status field d (FIG. 3) "synchronize transmission" is triggered in field 62.

Figure 7:
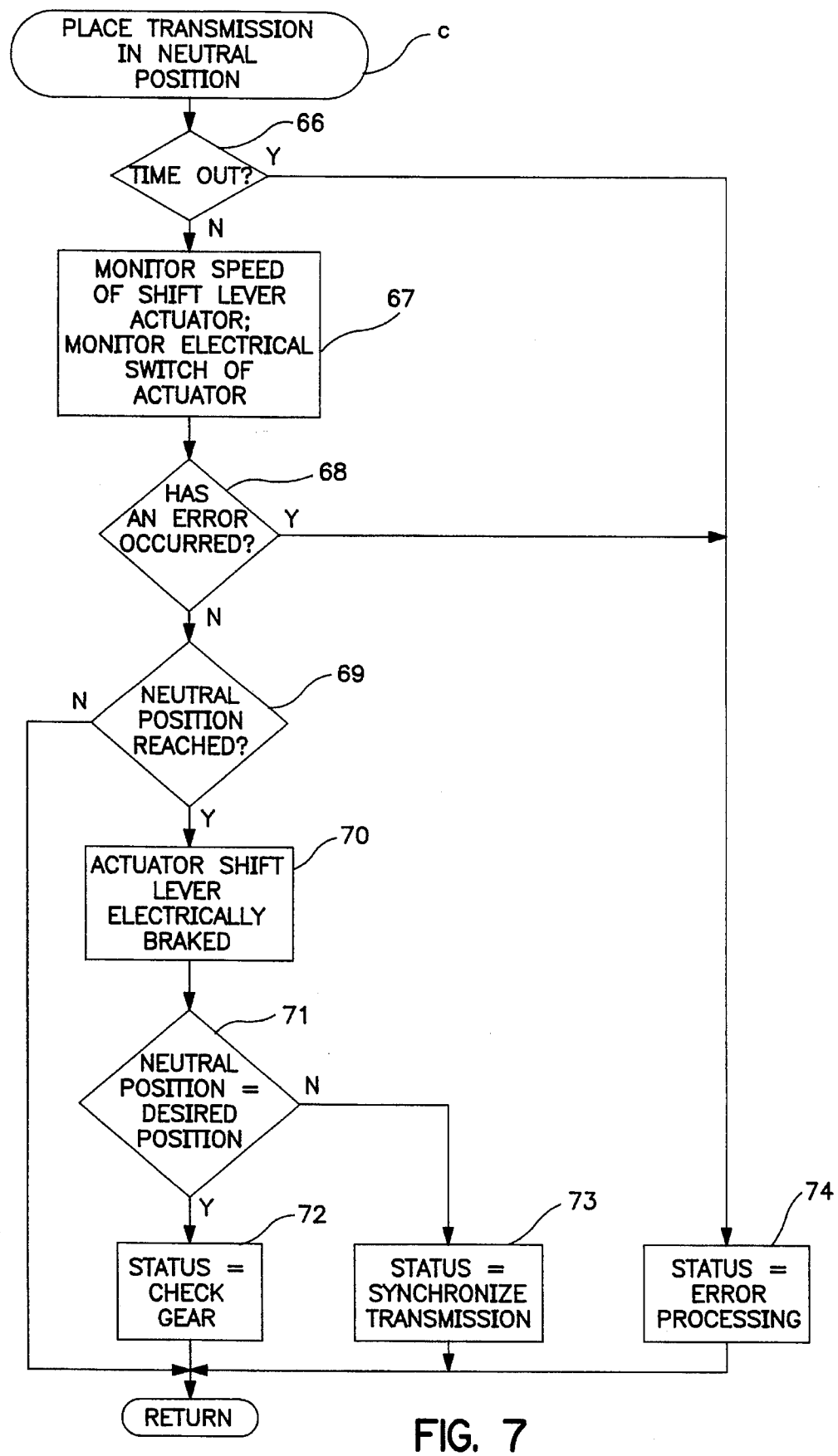

FIG. 7 shows the routine c (FIG. 3) "place transmission in neutral position". Fields 66, 68 and 74 are again error control fields similar to fields 55 and 63 in FIG. 6. Additional safety measures against mechanical or electrical interference anywhere in the circuit between selection lever and actuator can be achieved through the sub-routine "monitor speed of shift lever actuator; monitor electrical switch of actuator" A2. As long as the neutral position has not been reached (field 69), the routine is repeated until it is reached. Then, if applicable after execution of the sub-routine "actuator shift lever electrically braked" (field 70), the decision is taken in field 71 whether the neutral position is also the desired position. If yes the system returns into the status field 72 "check gear" (field a in FIG. 3). If not, the system goes via field 73 into the next status field d "synchronize transmission".

Figure 8:
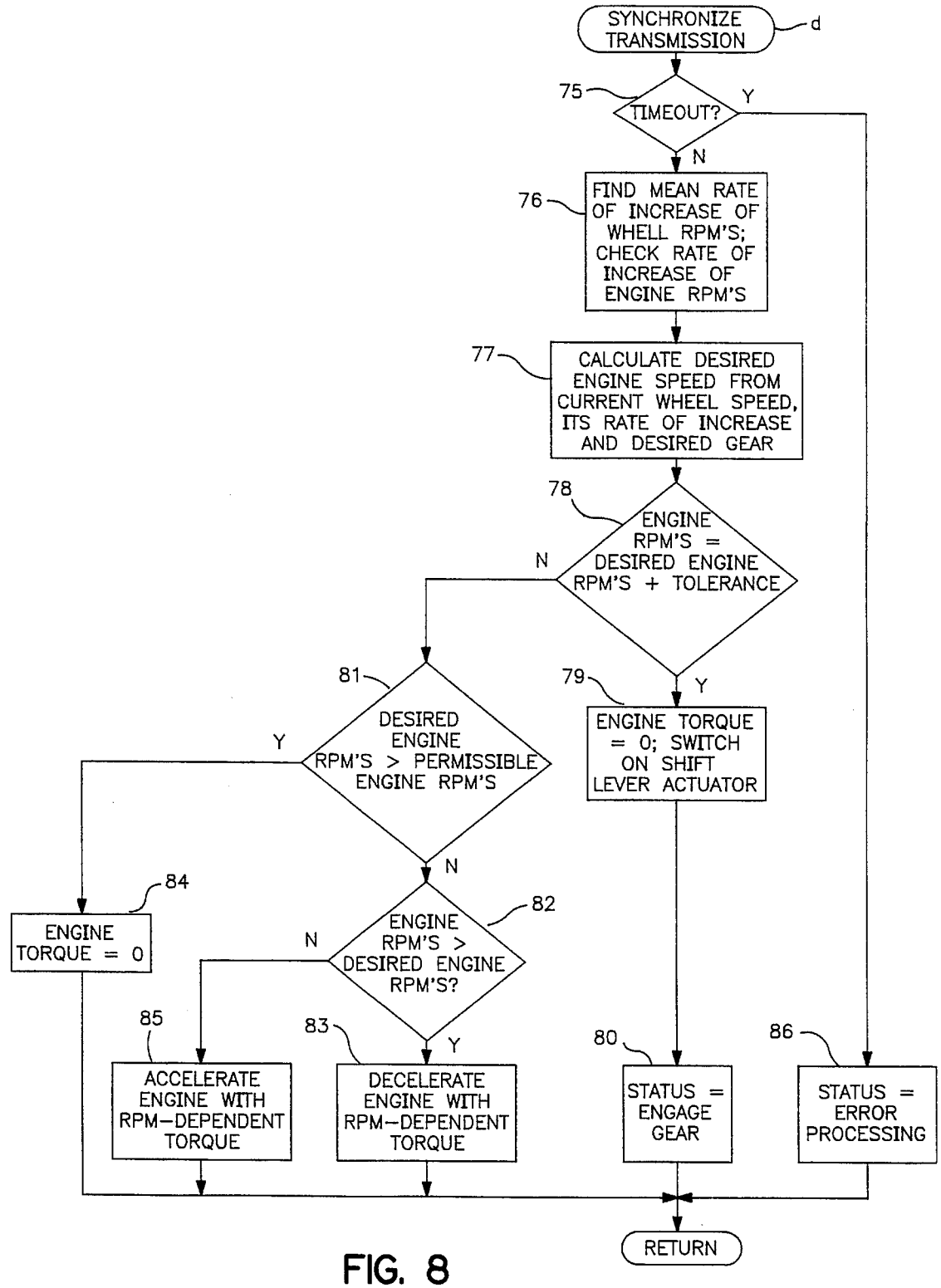

FIG. 8 shows routine d of FIG. 3 "synchronize transmission". Following the time control of fields 75 and 86, two subroutines are implemented. First, in field 76 "ascertain mean rate of increase of wheel speed; check rate of increase of engine", then in field 77 "calculate desired engine speed from current wheel speed, its rate of increase and desired gear". A verification is then made in field 78 whether the current engine speed is equal to the desired engine speed within a tolerance depending on the design of the couplings. For as long as this is not the case, the following measures are taken: First, a decision is made whether the desired engine speed is greater than the permissible engine speed (field 81). If yes, the engine torque is set to zero (field 84) until the desired engine speed falls below the pertinent limit value. If not, a decision is taken on whether the current engine speed is greater than the desired engine speed (field 82). As they cannot be equal due to field 78, one of the two subroutines "decelerate engine with RPM-dependent torque" (field 83) or "accelerate engine with RPM-dependent torque" (field 85) is called up. When synchronization has been achieved, the system goes on at field 78 to the sub-routine "engine torque is zero; switch on shift lever actuator" (field 79) and then continues to the status field 80 "engage gear" (field e in FIG. 3.)

Figure 9:
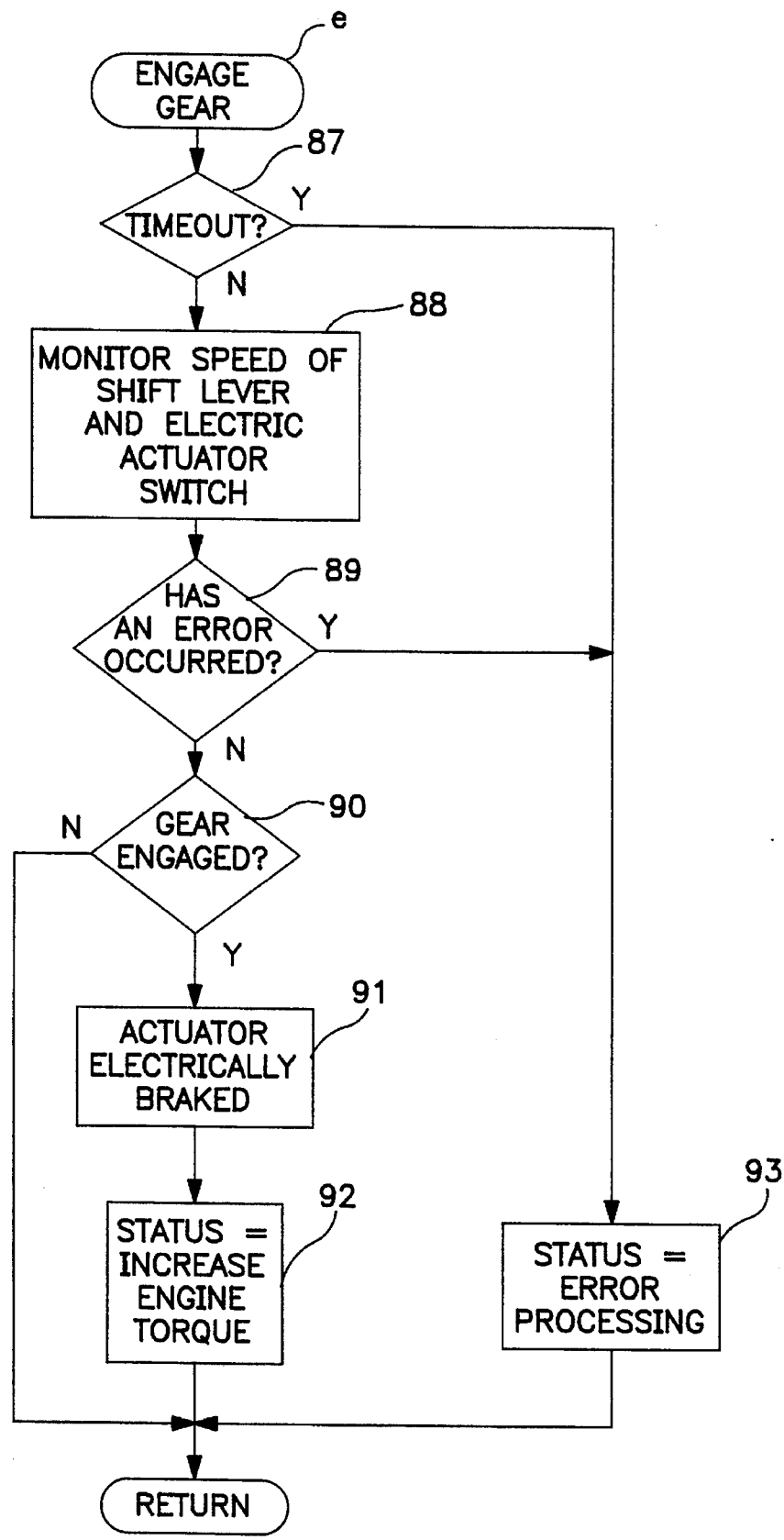

FIG. 9 shows routine e of FIG. 3 "engage gear". The steps in fields 87, 89, 90 and 93 are again control steps. The sub-routine in field 88, "monitor speed of shift lever and electrical actuator switch" controls the movement of the actuator, similarly to the control of routine c. The system goes repeatedly through this routine until it ascertains in field 90 that the gear has been engaged. Then the sub-routine "actuator electrically braked" (field 91) is carried out in that field and the shifting movement of the actuator is thus terminated. Finally the system goes on to field 92 "increase engine torque" (field f in FIG. 3) and thereby to the last routine.

Figure 10:
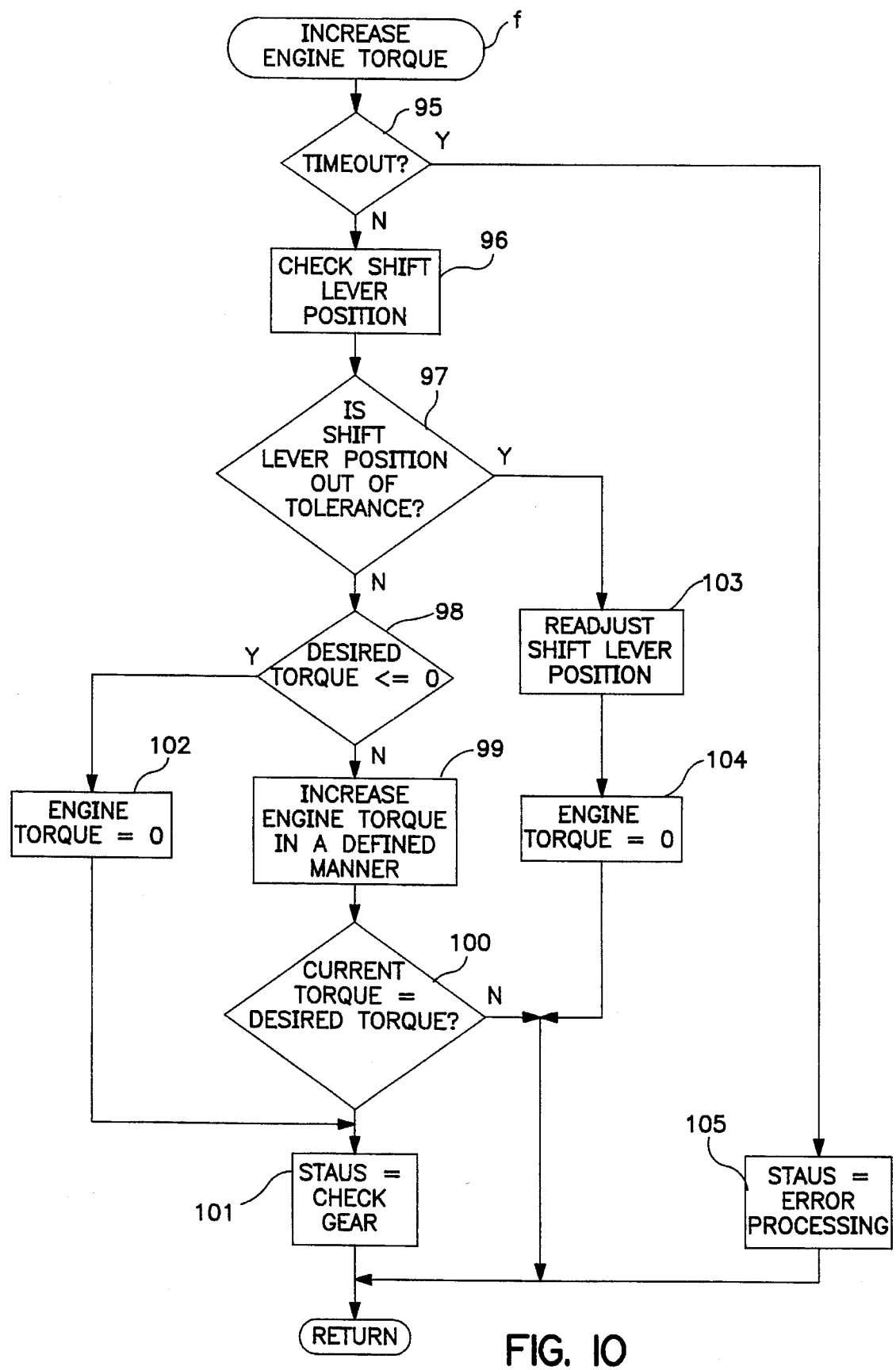

FIG. 10 shows routine f of FIG. 3 "increase engine torque". After the time control (fields 95, 105) and the sub-routine "check shift lever position" (field 96), the actuator position is checked (field 97) and readjusted (field 103) if necessary so that an increase of torque is cut off (field 104) if the dog clutch is not completely engaged (as may occur). A decision is then made in field 98 on whether the desired torque signal 16 delivered by the brake pedal sensor is negative, which would indicate engine braking. In case of engine braking the desired brake torque indicated by the brake pedal is set immediately, without a ramp increase. The current engine torque is then set to zero (field 102) and the system jumps into a subroutine "engine braking" which is not described in further detail. If the current desired torque is greater than zero, it is increased in the sub-routine "increase engine torque in a controlled manner" (field 99) until the current torque is equal to the desired torque (field 100). When this status has been reached the shifting process is ended, the system returns to the status field "check gear" (field 101 and field a, FIG. 3) and the entire sequence (FIGS. 3 to 10) is repeated.

While the invention has been described by reference to specific embodiments, this was for purposes of illustration only. Numerous alternative embodiments will be apparent to those skilled in the art and are considered to be within the scope of the invention.

We claim:

1. A drive arrangement for an electric motor vehicle, comprising an electric motor, a control rectifier which is connected to and controls the output of said electric motor, a gear box having at least first and second gears, said gear box including an input side which is connected to said electric motor and an output side, first and second positively engaging clutches associated with said first and second gears respectively, a movable actuator which, depending on the position of said actuator, causes said first and second positively engaging clutches to engage said first and second gears, sensors associated with said gear box and said actuator to detect rotational speed at said input and output sides of said gear box and the position of said actuator, and to produce signals indicative thereof, wherein a signal indicative of said rotational speed at said input side of said gear box is provided to said control rectifier, and wherein a signal indicative of torque at said input side of said gear box is provided by said control rectifier, and a control unit connected to said actuator and said control rectifier, said control unit receiving all of said signals from said sensors and producing signals based thereon to control the position of said actuator and the output of said electric motor via said control rectifier to synchronize the respective clutches prior to engagement of said first and second gears.

2. The drive arrangement of claim 1 further comprising a manual gear selection lever which produces a signal indicative of a manually selected gear, said control unit receiving said signal indicative of said manually selected gear and causing said actuator to engage said manually selected gear.

3. The drive arrangement of claim 1 wherein said control unit comprises a microprocessor which runs a stored program repetitively.

4. A process for shifting gears in a drive arrangement for an electric motor vehicle, said drive arrangement comprising an electric motor the output of which is controlled by a control rectifier, a gear box having at least first and second gears, first and second couplings associated with said first and second gears, and a movable actuator which causes said first and second couplings to engage said first and second gears, said process comprising (a) verifying whether an actually engaged gear is a desired gear, wherein said desired gear is calculated automatically from signals indicative of the rotational speed at an output side of said gear box, and the torque produced by said electric motor, (b) if not, issuing a shift command signal which lowers the torque being produced by said electric motor to zero along a defined lowering torque path, (c) bringing said actuator into a neutral position, (d) by means of said control rectifier, changing the output of said electric motor until it is rotating at a target rotational speed, (e) by means of said actuator and one of said couplings, causing said desired gear to become engaged when said electric motor reaches said target rotational speed, and (f) increasing the torque produced by said electric motor to a desired torque along a defined increasing torque path.

5. The process of claim 4 wherein said drive arrangement further comprises a manual gear selection device, said process further comprising determining if a gear has been manually selected, and setting said desired gear to said manually selected gear.

6. The process of claim 4 further comprising determining a limit rotational speed for said actually engaged gear and determining said desired gear by comparing an actual rotational speed at an input side of said gear box with said limit rotational speed.

7. The process of claim 6 wherein said limit rotation speed is determined from a gear-dependant constant value, a torque-dependent variable value, and a hysteresis factor.

8. The process of claim 6 further comprising comparing said desired gear with an actually engaged gear signal and in case of inequality, causing said desired gear to become engaged provided a brake of said vehicle is not actuated.

9. The process of claim 4 wherein said defined lowering torque path depends on a gas pedal position signal.

10. The process of claim 4 wherein the target rotational speed of said electric motor is determined based on the rotational speed at an input side of said gear box, the rate of increase thereof, and the desired gear.

11. The process of claim 4, wherein said defined increasing torque path depends on a gas pedal position signal.

12. The process of claim 4 wherein said actually engaged gear is determined from a ratio of the rotational speeds at an input side and an output side of said gear box and compared with the signal indicative of the position of said actuator and whereby, in case of inequality, the actuator is only triggered, if engine and vehicle are at standstill.

* * * * *